L. MITCHELL.
APPARATUS FOR AND PROCESS OF MAKING CRULLERS.
APPLICATION FILED FEB. 2, 1920.

1,382,926.

Patented June 28, 1921.
5 SHEETS—SHEET 1.

Inventor:
Leon Mitchell,
by Walter E. Lombard, Atty

Inventor:
Leon Mitchell,
by Walter E. Lombard
Atty.

L. MITCHELL.
APPARATUS FOR AND PROCESS OF MAKING CRULLERS.
APPLICATION FILED FEB. 2, 1920.
1,382,926.
Patented June 28, 1921.
5 SHEETS—SHEET 4.
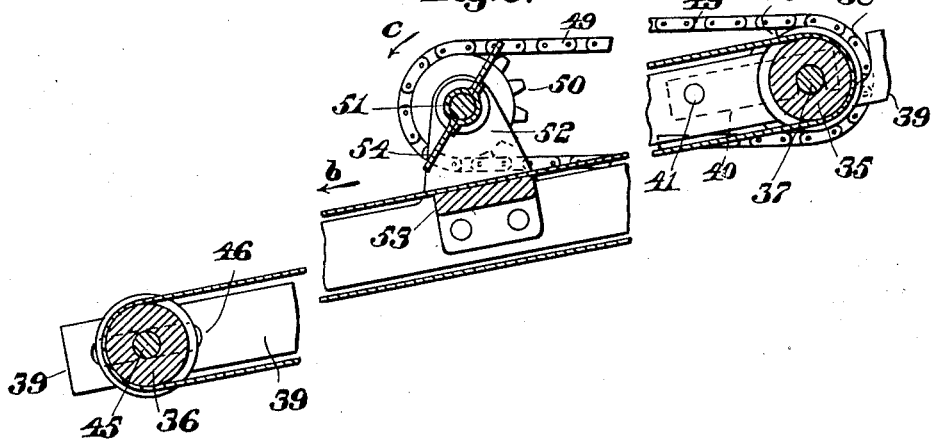
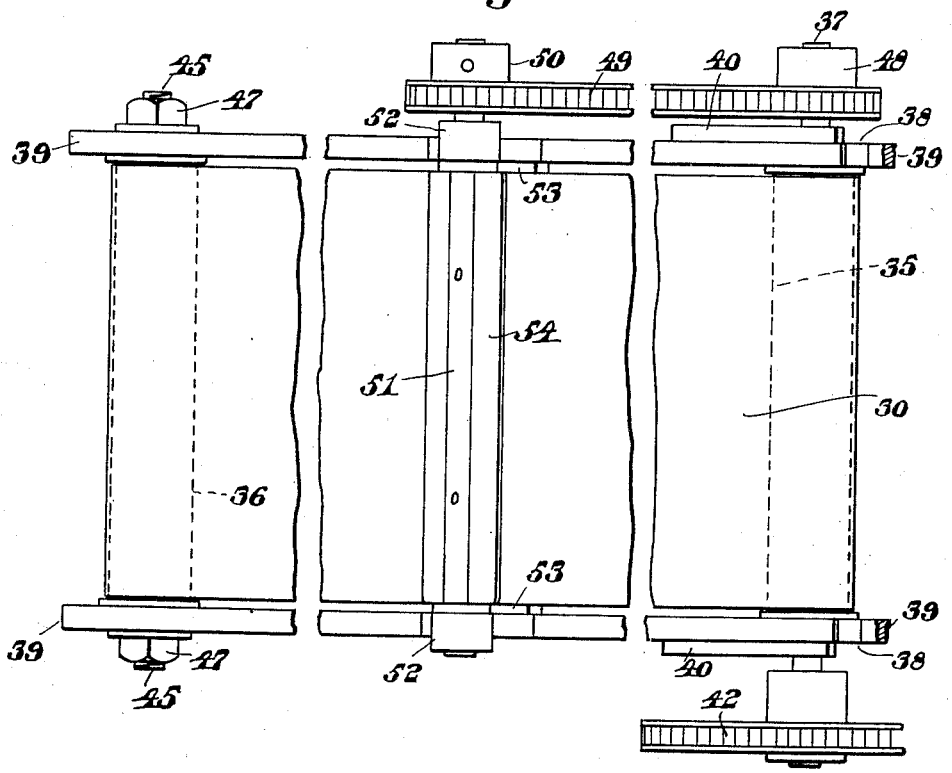
Inventor:
Leon Mitchell,
by Walter E. Lombard,
Atty.

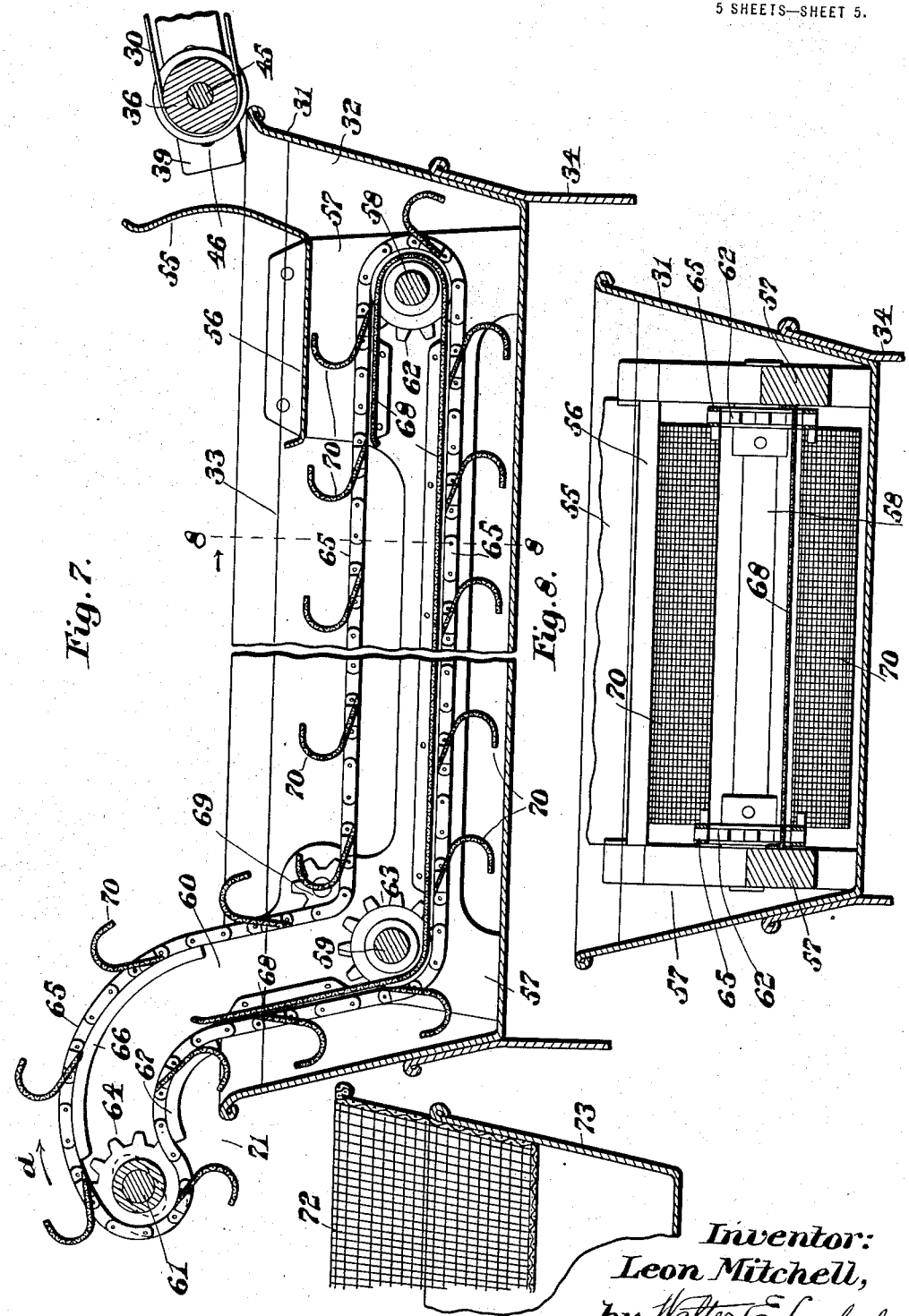

UNITED STATES PATENT OFFICE.

LEON MITCHELL, OF DORCHESTER, MASSACHUSETTS.

APPARATUS FOR AND PROCESS OF MAKING CRULLERS.

1,382,926.   Specification of Letters Patent.   Patented June 28, 1921.

Application filed February 2, 1920. Serial No. 355,791.

*To all whom it may concern:*

Be it known that I, LEON MITCHELL, a citizen of the United States of America, and a resident of Dorchester, in the county of Suffolk and Commonwealth of Massachusetts, have invented certain new and useful Improvements in Apparatus for and Processes of Making Crullers, of which the following is a specification.

This invention relates to means for making crullers and has for its object the provision of an apparatus for making articles of this character under sanitary conditions whereby during the entire operation, the dough utilized is automatically separated into sections and twisted and subsequently conveyed to the frying pan and therefrom to be deposited in a draining receptacle without requiring the dough or articles made therefrom to come into contact with the hands of the operator.

The invention consists of certain novel features of construction and arrangement of parts which will be readily understood by reference to the description of the drawings and to the claims to be hereinafter given.

The invention further consists of a novel method of making crullers and similar articles.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Fig. 5 represents a plan of the mechanism for conveying the twisted dough from the twisting devices to the frying pan.

Fig. 6 represents a longitudinal vertical section of the same.

Fig. 7 represents a longitudinal vertical section of the frying pan and its associated parts, and Fig. 8 represents a transverse section of the same on line 8, 8, on Fig. 7.

Similar characters indicate like parts throughout the several figures of the drawings.

Figure 1:
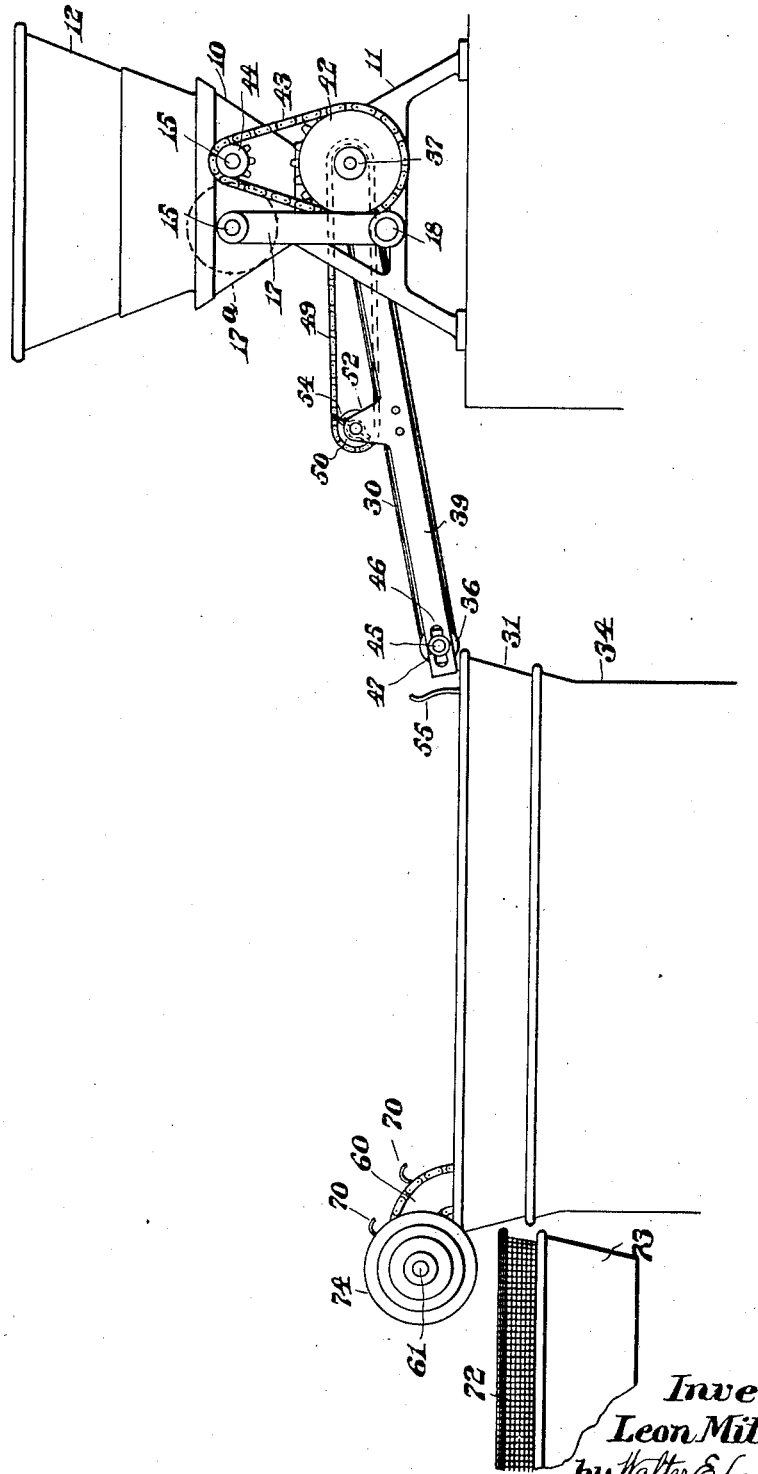
Figure 1 represents an elevation of an apparatus embodying the principles of the present invention.
Figure 2:
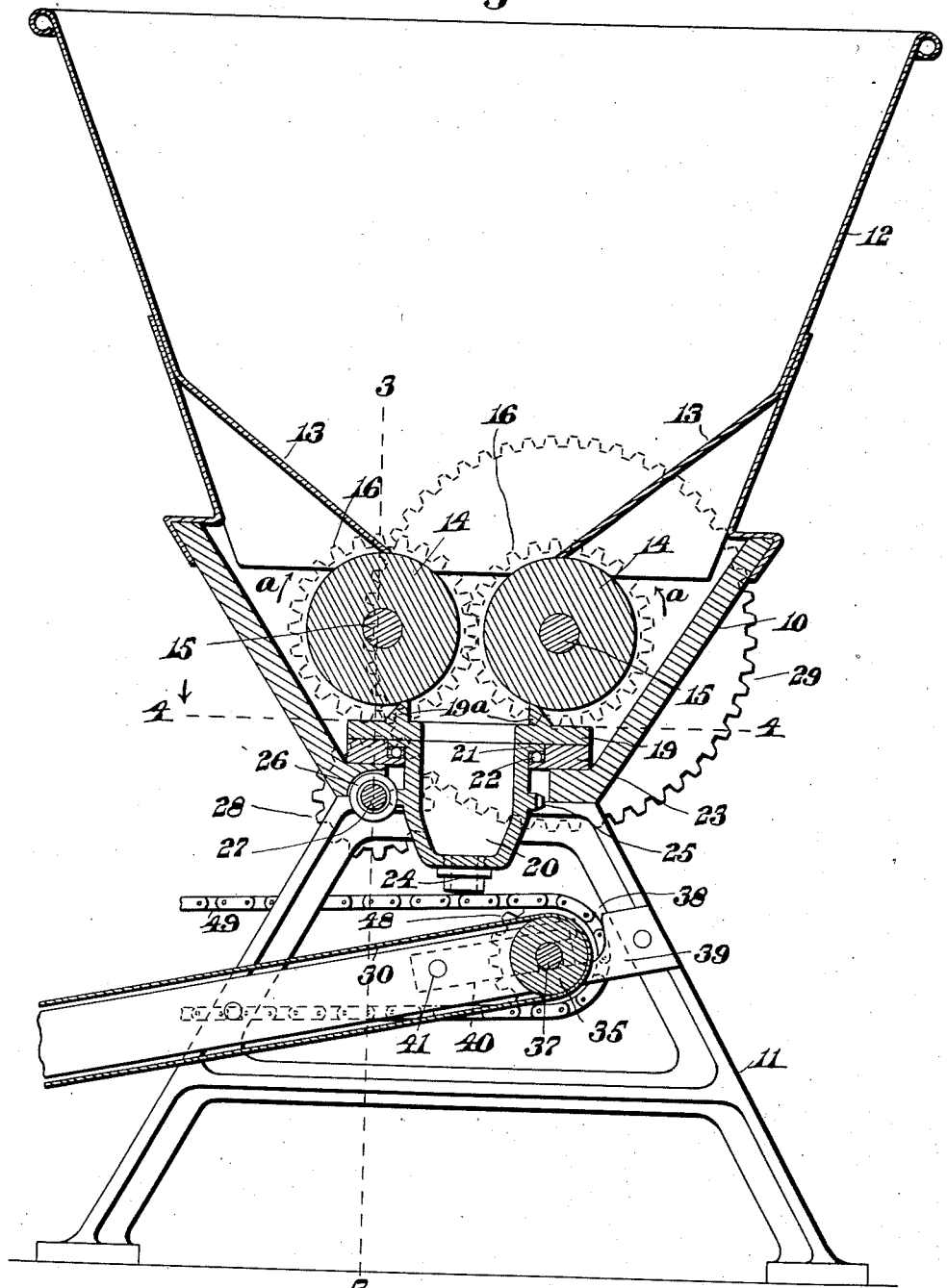
Fig. 2 represents a vertical section of the dough-receiving hopper and the instrumentalities coacting therewith.
Figure 3:
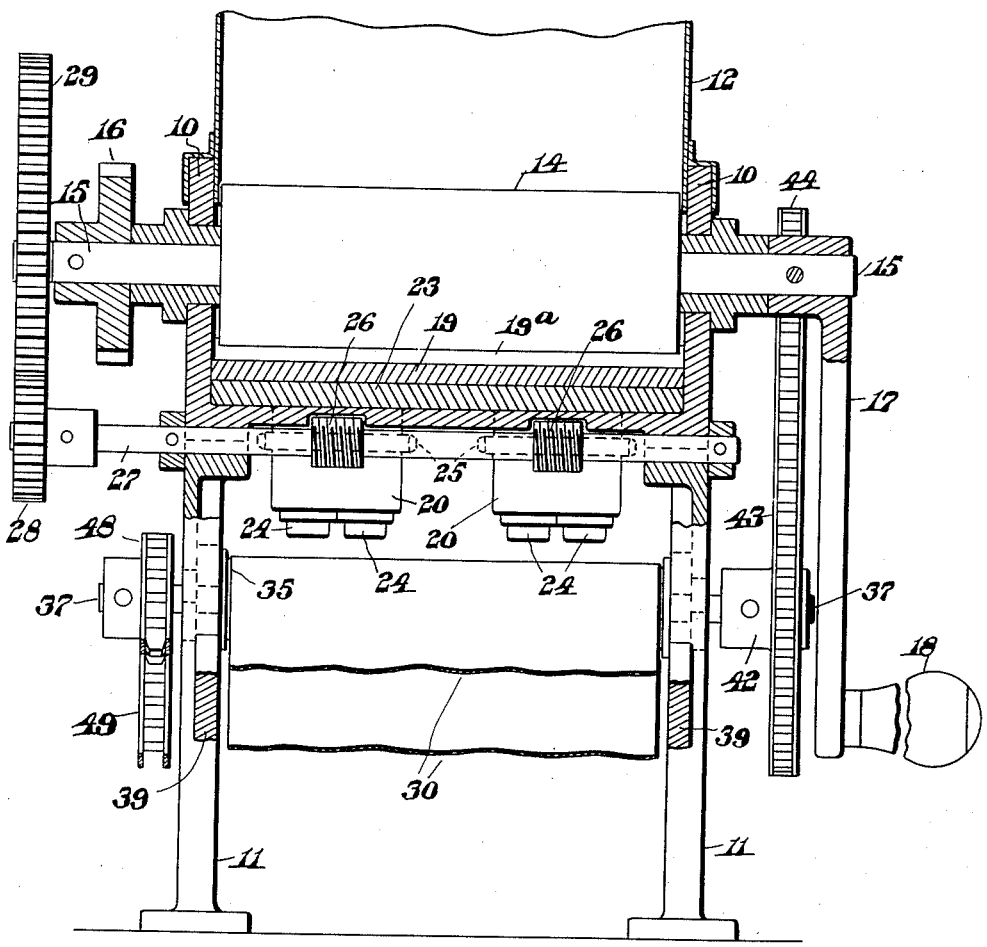
Fig. 3 represents a transverse section of the same on line 3, 3, on Fig. 2.
Figure 4:
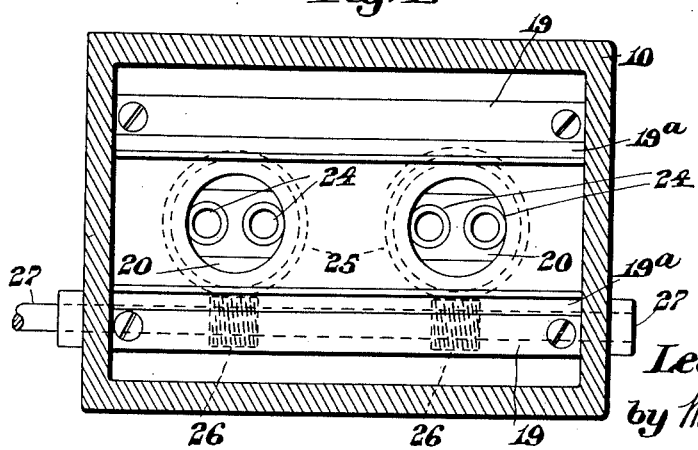
Fig. 4 represents a horizontal section of the same on line 4, 4, on Fig. 2.

In the drawings, 10 is a casing mounted upon a framework 11 and having superimposed thereon a hopper 12 having in the bottom thereof, walls 13 inclined downwardly and toward each other with their lower ends separated as indicated in Fig. 2 of the drawings.

Below the lower ends of these walls 13 are feed rollers 14 mounted on revoluble shafts 15 each shaft having secured to and revoluble therewith, a gear 16, these gears 16 meshing with each other thereby causing the feed rolls to be moved in unison in the direction of the arrows $a$ on Fig. 2 of the drawings.

One of the shafts 15 has secured thereto, a crank 17 provided with a handle 18 by which said feed rollers 14 may be revolved by hand.

If desired, the crank 17 may be removed and a pulley $17^a$ be substituted therefor thereby providing means for revolving the feed rolls by a motor.

The hopper 12 is adapted to be filled with dough and when, by means of the crank 17 the feed rollers 14 are rotated in the directions of the arrow $a$, the dough will be fed downwardly from the hopper 12 between the feed rollers 14 through the slotted plate 19 into a plurality of pockets 20.

The plate 19 is provided with scrapers $19^a$ which coact with the peripheries of the rollers 14 and prevent the dough being carried beyond said pockets 20.

These pockets 20 are each provided at its upper end with an annular flange 21 resting upon a plurality of balls 22 and disposed within a depression in the plate 23 in the bottom of the casing 10 beneath the plate 19.

Each pocket 20 is provided with two parallel cylindrical openings 24 extending downwardly through the bottom thereof and through which the dough in each pocket is adapted to be forced in two strings.

Each pocket 20 is provided with a worm gear 25 on the periphery thereof, said gears meshing with worms 26 secured to and revoluble with the shaft 27 having a pinion 28 on one end thereof which pinion meshes with a large gear 29 secured to and revoluble with one of the shafts 15.

By means of this construction, as the dough in the hopper 12 is fed downwardly into the pockets 20 and through the openings 24 in the bottom thereof, these pockets 20 will be rotated thereby causing the two strings of dough passing from the openings 24 to be twisted.

As the twisted strings of dough pass from the discharge openings 24 they will drop upon an apron 30, the upper end of which is beneath the openings 24 while the lower end thereof is immediately above one end of a frying pan 31 containing hot fat 32 to the level 33 as shown in Figs. 7 and 8 of the drawings.

This pan 31 is positioned on the upper end of any well-known construction of heating device 34 adapted to keep the fat at the desired temperature.

The apron 30 is mounted upon two drums 35 and 36. The drum 35 is mounted upon and revolves with a shaft 37 positioned in a bayonet slot 38 in the bars 39 which are secured to the frames 11 and project downwardly to a point above the upper edge of the frying pan 31.

The shaft 37 is retained in position within the bayonet slot 38 by means of the latch member 40 pivoted at 41 to the bars 39.

One end of the shaft 37 has secured thereto a sprocket wheel 42 to which rotary movement is imparted by means of a sprocket chain 43 from a sprocket wheel 44 on one of the shafts 15.

The roller 36 is secured to and revolves with a shaft 45 extending through elongated slots 46 in the lower ends of the bars 39.

When the apron 30 is perfectly taut, the shaft 45 of the roller 36 is clamped to the bars 39 by means of the clamping nuts 47.

One end of the shaft 37 has secured thereto a sprocket wheel 48 from which a chain 49 passes to a sprocket wheel 50 secured to and revoluble with a shaft 51 mounted in ears 52 extending upwardly from the bars 39.

Beneath the shaft 51 and secured to the bars 39 is a bed plate 53 upon which the apron 30 rests as it moves in the direction of the arrow $b$ on Fig. 6 of the drawings.

Secured to and revoluble with the shaft 51 is a severing plate 54 which is rotated in the direction of the arrow $c$ on Fig. 6 of the drawings.

The opposite ends of the plates 54 are adapted to contact with the surface of the apron during each rotation of said shaft 51.

As the twisted strings of dough is moved downwardly in the direction of the arrow $b$ upon an apron 30 and pass beneath the rotating severing plate 51, these strings of dough will be cut into sections of equal length by said plate.

As the severed sections are conveyed downwardly on the apron 30, they will be deposited into the frying pan 31 first striking against a deflector 55 thereby causing them to be turned into positions parallel with the axis of the shaft 45.

This deflector 55 extends upwardly above the upper edge of the frying pan 31 and is integral with a plate 56 extending transversely of the frying pan 31 at a point beneath the level 33 of the hot fat therein.

This plate 56 is secured to a framework 57 positioned within the frying pan 31 and having at opposite ends thereof, revoluble shafts 58 and 59 and at one end an upwardly extending curved extension 60 having adjustably mounted therein, a revoluble shaft 61.

These shafts 58, 59 and 61 have mounted thereon, sprocket wheels 62, 63 and 64 adapted to move the chain 65 superimposed thereon in the direction of the arrow $d$ on Fig. 7 of the drawings.

The extension 60 is provided with supporting flanges 66 and 67 for the chain 65 and the framework 57 has secured thereto, the guide members 68.

The framework 57 is also provided with rollers 69 as indicated in Fig. 7 of the drawings to maintain the endless chain 65 in the proper path as it is moved through the hot fat within the frying pan 31.

Between the chains 65 and secured thereto are a plurality of mesh baskets 70 which are adapted in the movement of the chains in the direction of the arrow $d$ to pick up the twisted sections of dough dropped into the pan 31 and convey said twisted sections downwardly and longitudinally of the bottom of said pan where they will be subjected to the hotest fat within said pan.

As these twisted sections reach the opposite end of the pan 31 they will be lifted by the baskets 70 over the upper edge of the pan and at 71 the twisted sections of dough now frying and forming crullers, will be dropped into the mesh receptacle 72 supported at the top of a pan 73.

The fat and drippings from the crullers deposited in the mesh receptacle 72 will drain through the bottom thereof into the pan 73.

The shaft 61 has secured thereto a driving pulley 74 by which rotary movement may be imparted to said shaft in order to move the chains 65.

The members through which the discharge openings 24 extend are threaded into the bottom of the pocket 20 and each machine is provided with a plurality of sets of these members, each set having a different sized opening 24 therein thereby providing means whereby different sized crullers may be made, by making the proper adjustments.

For convenience in making the drawings only two pockets 20 are shown but in practice the machine will be constructed with several pockets 20 in alinement all operating at the same time to deposit a plurality of sets of twisted strings of dough upon the conveyer belt 30.

Each machine is also provided with a plurality of sets of sprocket wheels 48 of different sizes, a different sized sprocket wheel being adapted to be used with each set of the members 24.

When it is desired to clean the conveyer belt 30, the latch 40 is moved about the pivot 41 thereby permitting the shaft 37 with the roller 35 thereon to be removed from the bayonet slot 38.

This makes it possible to quickly remove the conveyer belt 30 to clean it or for the purpose of substituting a fresh belt for the one previously used.

By means of an apparatus of this character, various sized crullers may be made without necessitating the operator touching the material from which the crullers are composed or the finished crullers after they have passed through the hot fat in the pan 31.

It is believed that the operation and the many advantages of the invention will be thoroughly understood without further description.

Having thus described my invention, I claim—

1. The method of making crullers which consists of ejecting onto a traveling apron two strings of dough from a hopper and simultaneously twisting the same, severing said twisted strings of dough while on said apron into sections of substantially equal length, delivering said twisted strings of dough separated from each other from said apron onto a conveyer, submerging the strings of twisted dough in a pan of hot fat and slowly moving them while thus submerged through said fat and frying them.

2. The method of making crullers which consists of ejecting onto a traveling apron two strings of dough from a hopper and simultaneously twisting the same, severing said twisted strings of dough while on said apron into sections of substantially equal length, delivering said twisted strings of dough separated from each other from said apron onto a conveyer, submerging the strings of twisted dough in a pan of hot fat and slowly moving them while thus submerged through said fat and frying them, and then automatically lifting the fried crullers from the fat and depositing them in a draining receptacle.

3. An apparatus for making crullers consisting of a dough-receiving hopper having means in the bottom thereof for twisting two strings of dough as they are ejected from said hopper; a conveyer for the twisted strings of dough; means coacting with said conveyer for severing said twisted strings of dough into sections of substantially equal length; a pan of hot fat into which said sections are deposited by said conveyer; a heating device on which said pan is positioned; and means within said pan for submerging said sections and conveying them while submerged in the fat from one end of said pan to the other and lifting said sections over the edge of said pan and depositing them into a receiver.

4. In an apparatus of the class described, a dough-receiving hopper having a discharge opening in the bottom thereof; parallel feed rollers beneath said discharge opening; a plate beneath said feed rollers having formed thereon scrapers coacting with the periphery of said rollers and having an opening therethrough; a revoluble pocket beneath said plate and alined with said opening and having two parallel discharge openings in the bottom thereof; and means for rotating said pocket.

5. In an apparatus of the class described, a dough-receiving hopper having a discharge opening in the bottom thereof; parallel feed rollers beneath said discharge opening; driving mechanism for said rollers; a plate beneath said feed rollers having scrapers coacting with the peripheries of said rollers and having an opening therethrough; a revoluble pocket beneath said opening and having two parallel discharge openings in the bottom thereof; and means actuated by said driving mechanism for rotating said pocket.

6. In an apparatus of the class described; devices for twisting strings of dough and cutting them into sections of substantially equal length; a pan adapted to contain hot fat; a heating device therefor; a submerged conveyer on which said twisted strings of dough are deposited extending over the edge of said pan and adapted to deposit said sections into the hot fat; and a deflector in said pan opposite the delivery end of said conveyer and adapted to position the strings of dough transversely of said pan upon said submerged conveyer.

Signed by me at 746–7 Old South Bldg., this 13th day of January, 1920.

LEON MITCHELL.

Witnesses:
WALTER E. LOMBARD,
NATHAN C. LOMBARD.